Feb. 20, 1934.  E. R. EVANS  1,947,905
BRAKE LINKAGE
Filed March 5, 1932  2 Sheets-Sheet 1
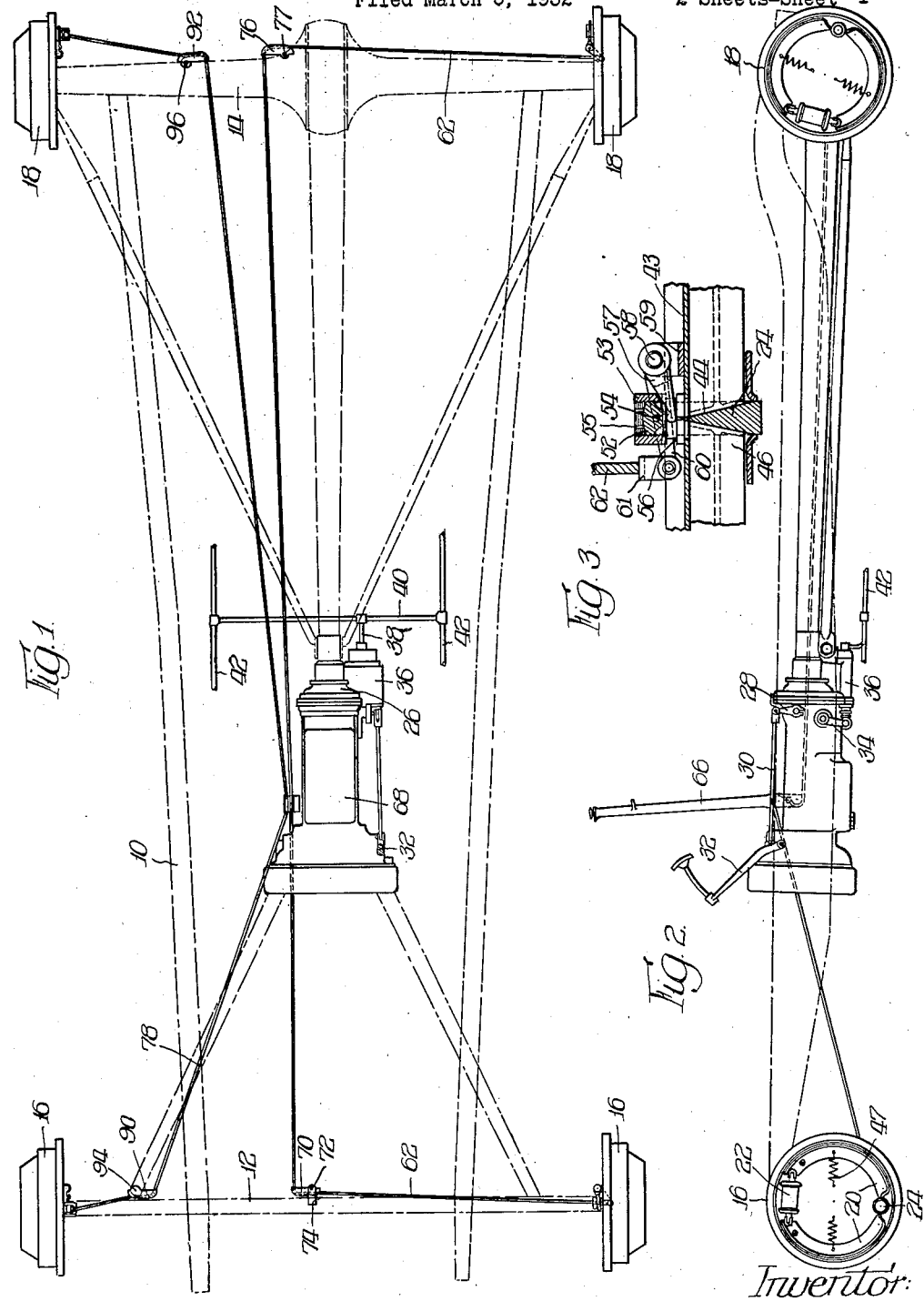
Inventor:
Edwin R. Evans,

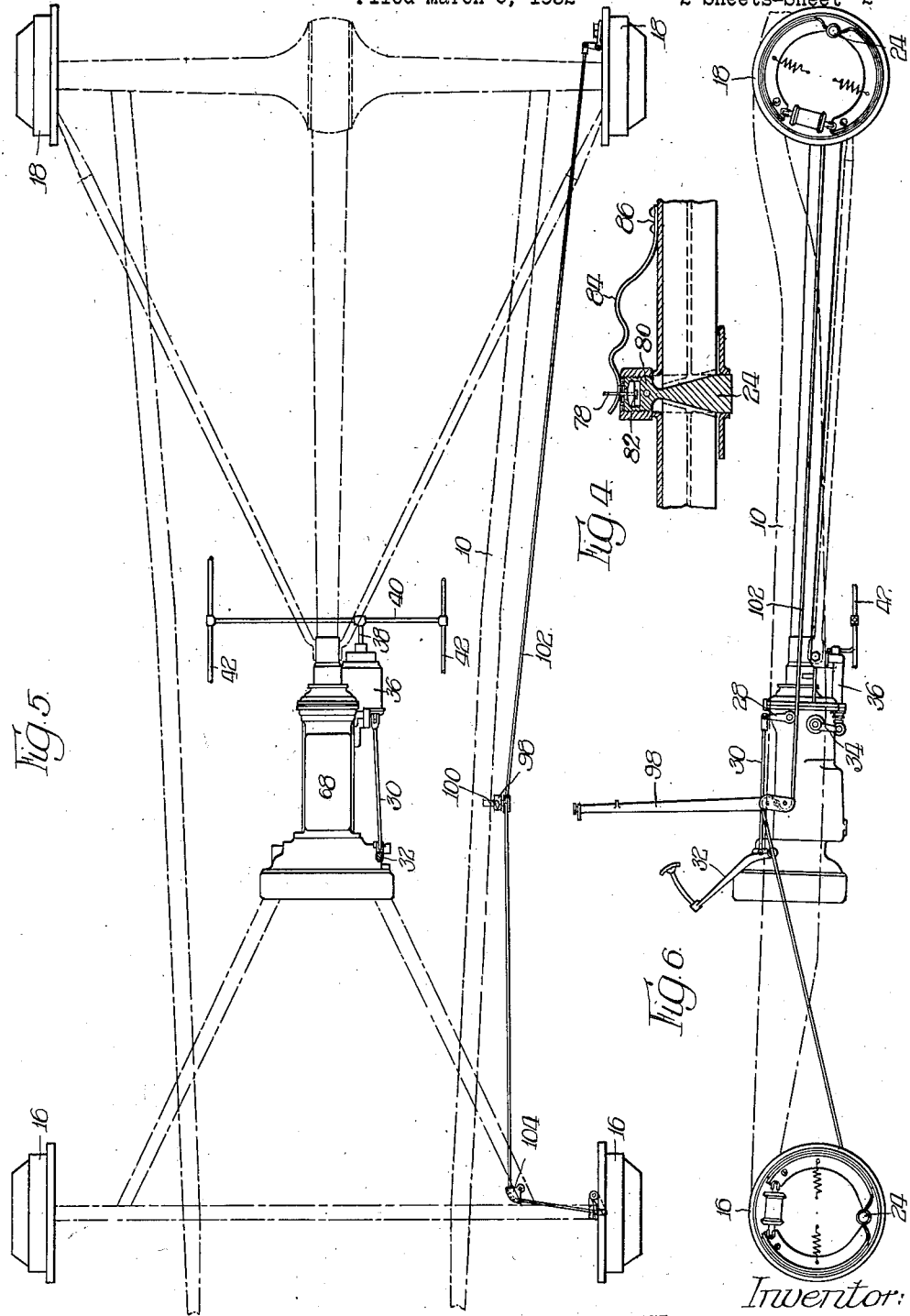

Patented Feb. 20, 1934

1,947,905

UNITED STATES PATENT OFFICE 1,947,905

BRAKE LINKAGE

Edwin R. Evans, Chicago, Ill.

Application March 5, 1932. Serial No. 596,938

11 Claims. (Cl. 188—106)

The present invention relates to improvements in brake linkage for motor vehicles particularly vehicles provided with four-wheel brakes.

It is an object of the present invention to provide a brake linkage for motor vehicles for actuating the wheel brakes through a pair of brake actuating systems which are independent except for the brake shoes, whereby the operator always has control of at least one set of brakes in spite of failure at any point of one of the braking systems.

It is further an object of the present invention to provide means for actuating hydraulic brakes independent of the hydraulic actuating means whereby the brake shoes may be forced into engagement with the brake drums in spite of failure of the hydraulic braking system.

It is further an object of the present invention to provide wheel brakes including a pair of brake shoes bearing at adjacent ends against an actuating means and at their opposite ends against an anchor pin which is slidably adjustable to take up wear of the brake linings and is further capable of being actuated by the operator to force the brake shoes into engagement with the brake drums and obtain effective braking, independent of movement of the usual actuating means.

Further and additional objects and advantages of the present invention will be more readily apparent from the following description taken in connection with the attached drawings, in which Figure 1 is a plan view of the brake linkage associated with a vehicle chassis, shown diagrammatically;

Figure 2 is a side elevation of the linkage shown in Figure 1;

Figure 3 is a detail section taken through one of the cut-out portions;

Figure 4 is a detail section similar to Figure 3 showing a modified construction;

Figure 5 is a plan view of a further modification of the brake linkage shown in Figure 1, and Figure 6 is a side elevation of the brake linkage shown in Figure 5.

The chassis 10 includes a front axle 12 and a rear axle 14. Front axle 12 supports front wheel hydraulic brakes 16 and the rear axle 14 supports rear wheel hydraulic brakes 18. The brakes, as shown in Figure 2, include brake shoes 20 connected at adjacent ends by piston cylinders 22 and bearing at their other ends against anchor pins 24. The power brake casing 26 has an input lever 28 actuated through rod 30 from the pivoted brake pedal 32. The output lever 34 of the power brake is adapted to actuate a fluid pressure control valve in casing 36 whereby fluid pressure is transmitted through pipe connection 38 to transverse pipe 40, the ends of which are connected to longitudinally extending pipe lines 42 adapted to transmit the fluid pressure to the piston cylinders of the front and rear wheel brakes 16 and 18.

The anchor pins 24 slidably supported by backing plates 43 are made in the form of wedges having inclined surfaces 44 contacting the tapered ends 46 of the brake shoes 20. The shoes 20 are held in released position by springs 47.

As shown in Figure 3 the anchor pins 24 extend through the backing plates 43 and have threaded outer ends 52 cooperating with adjustment nuts 53 which, in normal released position bear against the backing plates 43. Rotation of the nuts 53 will move the anchor pins 24 axially to adjust the brake shoes for wear of the brake linings. The adjustment is indicated and maintained by spring-pressed balls 54 carried by the threaded outer ends of the pins 24 and cooperating with grooves 55 in nuts 53. Each of the nuts 53 is further formed with an annular groove 56 engaged by the lever arm 57 supported by pivot 58. The pivot 58 is carried by bracket 59 fixed to the backing plate 43. The lever arm 57 is fixed to pivot 58 for movement with lever arm 60 which is connected by clevis 61 to cable 62. As shown in Figure 1 the cable 62 may extend between the levers 60 at the left hand front and rear wheel brakes 16 and 18 and intermediate of the vehicle extend through an S-shaped groove on a lever 66 pivoted at its lower end to the transmission casing 68. The cable 62 may be guided by a relay member 70 pivoted at 72 on a bracket 74 fixed to the front axle 12, and a similar relay member 76 pivoted at 77 on the rear axle 14. Thus actuation of the lever 66 will pull on cable 62 and serve to move the slidable anchor pins associated with the right-hand front and rear brakes for applying these brakes.

In the arrangement shown in Figure 1 the relays 70 and 76 are adapted to act as multiplying levers to increase the pressure transmitted through the cable 62 due to movement of the emergency lever 66. A similar cable 78 may extend between the slidable anchor pins of the right-hand front and rear wheel brakes 16 and 18. The cable 78 which serves to apply the right-hand front and rear brakes may be actuated by the same lever 66 so that all four wheel brakes may be applied manually through the operation of the emergency lever 66.

Figure 4 disclosing the manual cable control for the right-hand front and rear brakes discloses a modified manner of connecting cables to the anchor pins, in which the pins 24 have ball-shaped sockets 80 at their outer ends receiving ball-shaped pieces 82 fastened to the ends of cable 78. A leaf spring member 84 may be arranged to bear against one end of the anchor pin 24 and is fastened at its other end 86 to the backing plate 50. The leaf spring 84 assists in returning the anchor pin to normal position but it is understood that the leaf springs 47 acting upon the shoes will force the anchor pins through the inclined surfaces to released positions. The cable 78 is adapted to extend around the S-shaped portion of the lower end of emergency lever 66 in the same manner as cable 64 and the cable 70 is further guided by relays 90 and 92 pivoted at 94 and 96.

Figures 5 and 6 illustrate a modified arrangement in which an emergency lever 98 is guided by rock shaft 100 upon one side of the chassis frame 10 and adapted to actuate a cable 102 connected between the slidable anchor pins 24 of the left-hand front and rear wheel brakes. The cable 102 is shown to extend around a pivoted relay 104 which, however, is not formed to multiply the leverage.

The State regulations require independently operable means for actuating wheel brakes whereby breakage at any one point will not prevent application of the brakes. If an ordinary hydraulic brake system is used, it is only necessary to employ a propeller shaft brake controlled by the emergency lever as the independently operable braking means. However, if the hydraulic braking system is associated with a power unit operable from the pedal, but only in accordance with the momentum of the vehicle through association with the propeller shaft of the vehicle, it would not be possible to use an independent propeller shaft brake and comply with the regulations, since breakage of the propeller shaft would eliminate both braking systems. The present disclosure would comply with the regulations since the emergency braking system directly actuates the wheel brakes without any direct association with the hydraulic braking system. It will be understood that normally the brakes are applied through movement of the pedal which brings into operation the hydraulic actuating means. However, for parking purposes, or in case of failure of the hydraulic actuating means, the brakes may be applied through movement of the emergency lever which acts through the cables upon the slidable anchor pins associated with the wheel brakes. It will be further understood that the normal positions of the slidable anchor pins associated with the servo wheel brakes may be independently adjusted through movement of the adjusting nuts associated with the anchor pins.

A further advantage of the arrangement disclosed is that the brake shoe cylinders may have relatively short effective strokes which is not possible in the conventional hydraulic braking system because there is no adjustment for wear to the extent obtained by the adjustment means disclosed in the present application. In my construction with the wedge adjustment at the ends of the shoes opposite the hydraulic expanding means, either a short cylinder can be provided or a short stroke diaphragm similar to that disclosed in my Patent No. 1,515,018, issued November 11, 1924.

I claim:

1. In a brake mechanism, a wheel brake, pedal-controlled means for applying said wheel brake, wear adjusting means associated with said wheel brake and emergency lever controlled means for applying said wheel brake independent of said pedal controlled means by bodily movement of said adjusting means.

2. In a brake mechanism, a wheel brake, pedal-controlled means for applying said wheel brake, a slidable anchor pin associated with said wheel brake, means for sliding said pin for adjustment of said wheel brake and independent means for sliding said anchor pin to apply said wheel brake.

3. In a braking system, a pair of wheel brakes, pedal-controlled means for applying said wheel brakes, independently adjustable means associated with each wheel brake for taking up wear of the brakes and means for applying each of said wheel brakes independent of said pedal controlled means by bodily movement of said adjusting means independently of their adjustment.

4. In a braking system, a pair of wheel brakes, hydraulic means for applying said wheel brakes, adjusting means associated with each of said wheel brakes and means for applying each of said wheel brakes independent of said hydraulic means through concurrently moving said adjusting means independently of their adjustment.

5. In a brake mechanism, a pair of brake elements, expanding means between adjacent ends of said elements, a slidable anchor pin between the opposite ends of said elements, rotatable means for adjusting the position of said anchor pin to take up wear of the brake and means for moving said anchor pin together with said rotatable means for applying said brake.

6. In a braking mechanism, a pair of brake elements, expanding means between adjacent ends of said brake elements, a wedge-shaped anchor pin between the opposite end of said brake elements, an adjusting nut for moving said anchor pin to adjust said brake elements and means for sliding said anchor pin together with said nut for expanding said brake elements.

7. In a brake mechanism, a pair of brake shoes, expanding means between adjacent ends of said brake shoes operative by hydraulic pressure to apply said brake shoes, a wedge-shaped anchor pin between the opposite ends of said brake shoes, a rotatable adjusting nut for moving said anchor pin to adjust the normal released position of said brake shoes and means for moving said anchor pin independent of said adjusting nut for applying said brake shoes.

8. In a brake system, a pair of wheel brakes, pedal-controlled means for applying said wheel brakes, adjusting means associated with each of said wheel brakes, a connection extending between the adjusting means of each of said wheel brakes and means engaging said connection for applying each of said wheel brakes by movement of said adjusting means independently of the adjustment thereof.

9. In a vehicle brake system, a plurality of wheel brakes, operator-controlled means for applying said wheel brakes, adjusting means associated with each of said wheel brakes, means associated with each of said adjusting means for independently positioning said adjusting means and other means controlled by the operator for concurrently applying each of said wheel brakes independent of the first-named means by moving the adjusting means associated with each wheel brake.

10. In a vehicle brake system, a plurality of wheel brakes, pedal controlled means for applying said wheel brakes, a movable adjusting member associated with each of said wheel brakes and means associated with each of said movable adjusting members for independently adjusting said wheel brakes and operator controlled means for concurrently applying each of said wheel brakes independent of the pedal controlled means by moving the adjusting member associated with each of said wheel brakes independently of its adjustment.

11. In a vehicle brake system, a plurality of wheel brakes, pedal controlled means for applying said wheel brakes, an adjusting member associated with each of said wheel brakes, an adjusting nut associated with each of said adjusting members for independently adjusting said wheel brakes and operator-controlled means for applying each of said wheel brakes independent of said pedal-controlled means by moving the adjusting member and nut associated with each of said wheel brakes independently of the relative adjustment between the adjusting member and nut.

EDWIN R. EVANS.